(12) United States Patent
Park et al.

(10) Patent No.: US 6,331,598 B1
(45) Date of Patent: Dec. 18, 2001

(54) EMULSION POLYMER HAVING A VESICULATED STRUCTURE AND THE PROCESS FOR PREPARING THE SAME

(75) Inventors: Jong-Myung Park, Kyunggi-Do; Chang-Ho Choi, Seoul; Jung-Kwon Oh; Seung-Min Hong, both of Kyunggi-Do, all of (KR)

(73) Assignee: Korea Chemical Co., Ltd., Woolsan-si (KR)

( * ) Notice: Subject to any disclaimer, the term of this patent is extended or adjusted under 35 U.S.C. 154(b) by 0 days.

(21) Appl. No.: 09/379,905

(22) Filed: Aug. 24, 1999

(30) Foreign Application Priority Data

Aug. 25, 1998 (KR) .................................................. 98-34428

(51) Int. Cl.⁷ ............................ C08F 2/22; C08F 220/06; C08F 220/16; C08F 220/28; C08J 9/00
(52) U.S. Cl. ............................ 526/87; 524/458; 524/832; 524/833; 526/87; 526/88; 526/201; 526/318.4; 526/318.5; 526/318.6; 525/330.2
(58) Field of Search ...................................... 523/218, 200; 524/832, 833, 458; 526/87, 88, 318.4, 318.5, 318.6, 201; 525/330.2

(56) References Cited

U.S. PATENT DOCUMENTS

| | | | |
|---|---|---|---|
| 3,615,972 | 10/1971 | Morehouse, Jr. et al. | 156/79 |
| 3,891,577 | 6/1975 | Kershaw et al. | 260/2.5 |
| 4,427,836 | 1/1984 | Kowalski et al. | 525/301 |
| 4,973,670 | 11/1990 | McDonald et al. | 521/65 |
| 5,494,971 | 2/1996 | Blankenship | 525/301 |
| 5,639,805 * | 6/1997 | Park et al. | 523/201 |

FOREIGN PATENT DOCUMENTS 60-252635   12/1985   (JP) .

* cited by examiner

Primary Examiner—David W. Wu
Assistant Examiner—Kelechi Egwim
(74) Attorney, Agent, or Firm—Fleshner & Kim, LLP

(57) ABSTRACT

A process for preparing an emulsion polymer comprising placing a first mixture of monomers in a feed tank B which is connected directly to a reactor, placing a second mixture of monomers in a feed tank A which is connected to the feed tank B, and continuously varying the composition ratio of the monomers of feed tanks A and B in the emulsion polymer. The composition ratio is varied by varying the rate of feeding of the second mixture of monomers present in tank A into tank B while simultaneously varying the rate of feeding of the first mixture of monomers present in tank B into the reactor. The polymerization occurs as the first and second mixtures of monomers are simultaneously fluxed in the reactor while stirring.

20 Claims, No Drawings

EMULSION POLYMER HAVING A VESICULATED STRUCTURE AND THE PROCESS FOR PREPARING THE SAME

FIELD OF THE INVENTION

The present invention relates to an emulsion polymer having a vesiculated structure, which is suitable for use as an opacifying agent in paints, paper coatings and molding compositions, and to the preparation process thereof. More specifically, the present invention relates to an emulsion polymer and the preparation method thereof, which comprises a single-stage emulsion polymerization method with addition of continuously changing compositions, wherein vesiculated particles are formed by means of the drying process after being swollen by alkali.

BACKGROUND ART

A method of preparing polymer particles having internal vesicles, as a replacement of titanium dioxide used as a white pigment in manufacturing water-born paints or paper coatings for cost reduction, or improvement in gloss and processibility, is publicly known.

U.S. Pat. No. 3,615,972 discloses a method of preparing vesiculated particles by first manufacturing the plastic particles containing the foaming agents and then foaming by heat. U.S. Pat. No. 3,891,577 discloses a preparation method of vesiculated polyester particles of 1~25 microns of diameters by the so-called double emulsion method that utilizes the form "water/oil/water emulsion." Japanese Pat. Pub. No. 85-252635 discloses a method of producing solvent-containing particles, after which are subjected to vaporization swelling. However, all of these inventions suffer from such drawbacks as difficulties in preparation of the uniform particles, large-sized particle diameters, a broad distribution of variation in particle diameters, poor synthetic stability, poor storage stability, and economical inefficiency for commercial mass production.

U.S. Pat. No. 4,427,836, which has solved such problems, provides a method of preparing vesiculated particles having closed vesicles, wherein particles are first produced by the core-shell multistage emulsion polymerization process in which particles of alkali-swellable cores with high contents of acid monomers are encapsulated by oleophilic polymers with little acid monomers, and then the water inside the particles is released during the drying process. In the case of such polymerization process of the form of a "hydrophilic core-hydrophobic shell," a phase inversion is much likely to occur on the interface between the core and the shell. In other words, since a hydrophobic core-hydrophilic shell is more stable thermodynamically, the phase inversion would naturally take place. In order to prevent this phase inversion, the composition of the monomer mixture, the glass transition temperatures of the polymers formed, the types and quantities of emulsifiers, the types and quantities of polymerization initiators, reaction temperatures etc. must be governed in an optimum way at each stage of the polymerization process. To this end, the method suffers from the defects caused by these restrictions such as the narrow limitation of product compositions, the complicated and inefficient processes, and the like. Particularly, if the hydrophilicity of the core-forming polymer positioned in the center of the particle is far greater than that of the shell-forming polymer constituting the sheath of the particles, there arises an unavoidable problem that at least one step for forming the shell must be added to enhance the efficiency of encapsulation. Another problem exists in that although the core particle should contain a high amount of acid monomers in order to maximize the efficiency of alkali-swelling, the polymerization stability becomes poor, and the efficiency of encapsulation in the subsequent process declines if the amount of acid monomers in the core particles is over 40% by weight. To this end, the amount of acid monomers had to be limited, thereby causing a defect of failure to maximize the efficiency of alkali swelling. Moreover, there was also a problem of an unnecessarily thickened shell. To be specific, the wall of the finally produced vesiculated particle becomes inevitably thicker than it may be needed because if it is desirable to encapsulate the hydrophilic core, the shell-forming monomers should be used at least 4 times, preferably 8 times, as much as the core-forming monomers in order to obtain the concentric core-shell particle structure.

U.S. Pat. No. 5,639,805, which was an improvement of the above, used a feed method of gradually changing the composition of the monomer mixture in the shell-forming stage, thereby minimizing the wall thickness of hollow polymer particles, and as a result, contributing to cost-reduction by decreasing the amount of polymeric materials used. In this case, too, however, the decrease in productivity could not be avoided in this multistage emulsion polymerization process.

U.S. Pat. No. 5,494,971 discloses a process without the use of a tie-coat layer which is separately introduced to buffer the differences in hydrophilicity between the core particle polymers and the monomer compositions used in the shell emulsion polymerization process. In this process, the acid monomer is added separately and concurrently in the initial stage of formation of the main shell polymerization in order to eliminate the need for a tie-coat layer, thereby naturally forming a polymer of intermediate hydrophilicity on the interface between the core and the shell. In this way, this process could reduce one step among many steps in the polymerization process. However, this process had a weak point in that the time required for completion of the polymerization could not be sufficiently reduced due to the adoption of the two-stage polymerization process.

U.S. Pat. No. 4,973,670 discloses a single-stage method of preparation characterized in that a single-stage emulsion polymerization process is carried out in the presence of an organic solvent, and then the emulsion polymer so produced is dried to develop the particles having vesiculated structures. This method, however, suffers from the fact that it could not develop the particles of uniform interior structure because it was not easy to control the organic solvent of high fluidity to be positioned at the center of the particle during the phase separation process of the polymer—the separation process being performed concurrently in the course of polymerization process.

As described above, most of the conventional processes of preparing emulsion polymer particles suitable for use as an opacifying agent are the ones using the core-shell polymerization method. However, in such processes, it is difficult to control the interior structure of the particles as intended due to the considerable differences in hydrophilicity between each polymer layer, thereby the concentration of the acid monomer of the core polymer having to be restricted to less than 40% by weight; when the water is removed during the drying process of the hydrated swollen polymer particle, it is much probable that the wall of the particle collapses by the volume contraction force applied to the interface between the swollen core polymer and the hydrophobic shell polymer; the eccentric core-shell particles, which are partially formed in the course of encapsulating the exterior of the hydrophilic core particle with the hydrophobic polymer, form the vesicles of opened forms, which is problematic, when the hydrophobic polymer inside the particle is released out of the particle during the neutralization/swelling process.

SUMMARY OF INVENTION

The purpose of the present invention is to solve the aforementioned problems and to provide an emulsion polymer and the manufacturing method thereof, which comprises a single-stage emulsion polymerization method with addition of continuously changing compositions. More particularly, the present invention uses the single-stage emulsion polymerization method with addition of continuously changing compositions, wherein the amount of acid monomers is highest in the center of the particle with gradually decreasing towards the outer periphery of the particle so that the hydrophilic polymer can be more effectively encapsulated by the hydrophobic polymer. As such, polymer particles having vesiculated structures are formed, with the result of achieving the enhanced productivity and cost reduction.

DETAILED DESCRIPTION OF THE INVENTION

The present invention is characterized in that a single-stage emulsion polymerization method with addition of continuously changing compositions is used for preparing a vesiculated emulsion polymer suitable for use as an opacifying agent.

In order to continuously change the composition of monomers which are fed into the reactor by reaction time, two monomer feed tanks are used with one tank (tank B: the tank near the reactor) being connected directly to the reactor and the other tank (tank A: the tank far from the reactor) to tank B in a row. Then, the monomers present in tank B, and the mixture of monomers which are added to tank B from tank A are to be fed to the reactor simultaneously. As such, at the initial stage of polymerization process, the composition of monomers fed to the reactor is the same as that of the monomers present in tank B, and gradually changing to the composition of the mixture with the monomers from tank A, and ultimately, to the composition of the monomers from tank A. In this process according to the present invention, one or more additional tanks may be connected to tank A for the purpose of feeding the mixture of two or more monomers to the reactor.

An automated feed valve facility would make it possible to employ a process wherein two monomer feed tanks are directly connected to the reactor, and the rate of feeding monomers from one tank is gradually increased while gradually decreasing the rate of feeding from the other tank.

The hydrophilic monomer composition containing a relatively high level of acid monomer is added to tank B directly connected to the reactor, and the hydrophobic monomer composition is added to tank A. Then, the monomers present in tank A are loaded into tank B while at the same time the mixture, which is blended into tank B and well stirred for better mixing, is loaded into the reactor. By gradually increasing the rate of feeding monomers present in tank A while decreasing simultaneously the rate of loading monomers present in tank B in a gradual manner as well, the monomer mixture containing a high level of hydrophilic acid monomers is loaded to the reactor at the initial stage of reaction, but in the terminal stage of the reaction, the monomers containing a relatively high level of a mixture of hydrophobic monomers are fed to the reactor. Although the monomers may be loaded to each tank, respectively, it is desirable to use a pre-emulsified liquid medium wherein the emulsifier, initiator, and deionized water are mixed therein, in consideration of the stability of the polymerization system and the condition for monomer depletion. By the term "condition for monomer depletion," it means a condition based on which the minimum amount of monomers fed to the reactor is present so as to prevent influences on the behavior of particle growth.

The emulsion polymerization of the present invention is carried out by feeding the monomer mixture in such a manner as stated above, and a neutralizer is added during or after the emulsion polymerization so as to swell the polymer particles by hydration. The polymer particles so swollen are dried for the purpose of developing closed microvoids therein.

The present invention does not indispensably require the step of forming a seed particle. However, the use of a seed polymer at the initial stage is desirable so that the particle diameter of the final particle can be controlled as desired and the polymerization stability of the hydrophilic monomer can be secured. The emulsion polymer from the common acrylic group with its particle diameter being 0.02~0.3 micron is preferred as a seed particle. The concentration of the seed particle is preferably 0.1~10% by weight, based on the total weight of the final emulsion polymer, or more preferably 0.2~5% by weight.

The monomer mixture of the hydrophobic monomers present in tank A (hereinafter referred to as the "monomer A") in accordance with the present invention consists of 90~100% by weight, of one or more of ethylenically unsaturated monomers, and 0~10% by weight, of one or more of hydrophilic monomers. The glass transition temperature of the produced polymer is over 30° C., preferably over 40° C. As deemed necessary, a chain transfer agent may be added, as much as 0~5% by weight, based on the total monomer weight, and a non-reactive organic solvent, as much as 0~30% by weight.

The monomer mixture of the hydrophilic monomers present in tank B (hereinafter referred to as the "monomer B") in accordance with the present invention consists of 0~80% by weight, of one or more of ethylenically unsaturated monomers, 10~90% by weight, of one or more of hydrophilic acid monomers, 0~50% by weight, of one or more of hydrophilic monomers other than acid monomers, and 0~5% by weight, of one or more of cross-linkable polyfunctional monomers. Here, the glass transition temperature is not necessarily limited, as is the case of the monomer A.

Such ethylenically unsaturated monomers as mentioned above may include styrene, vinyltoluene, methylstyrene, ethylene, butadiene, vinylacetate, vinylchloride, vinylidenchloride, acrylonitrile, alkylacrylate, alkylmethacrylate, and the like. Suitable hydrophilic acid monomers used in the present invention may include acrylic acid, methacrylic acid, crotonic acid, itaconic acid, fumaric acid, maleic acid, monoalkyl maleate, monoalkyl fumarate, monoalkyl itaconate, vinylbenzoic acid, and the like. Examples of other hydrophilic monomers include hydroxyalkyl acrylate, hydroxyalkyl methacrylate, acrylamide, and the like. One or more of aryl acrylate, aryl methacrylate, ethyleneglycol, dimethacrylate, ethyleneglycol diacrylate, 1,6-hexanediol diacrylate, 1,6-hexanediol dimethacrylate, diaryl phthalate, tripropylene glycol dimethacrylate, trimethylolpropane, trimethacrylate, etc. may be used as a cross-linkable poly-functional monomer for the monomer B.

Where needed, a non-radical polymerizable organic acid selected from benzoic acid, azelaic acid, phthalic acid, adipic acid, and the like may be included as much as 0~80% by weight, based on the weight of the monomer B.

The solvents used in the present invention may include an aliphatic hydrocarbon solvent, aromatic hydrocarbon solvent, alcohol solvent, and the mixture thereof. The preferred amount of the solvent is 0~30% of the solid content of the finally obtained emulsion polymer. The major role of this solvent is to aid in swelling of the particles during the neutralization process and to expedite drying during the drying process. The solvent can be added to tank A or tank B or from a separate tank for a certain period of time.

The initiator allowable in the present invention, which may be either aqueous or oily, may be used alone or together with a reducing agent. In case of using an initiator such as ammonium persulfate, sodium persulfate, or potassium persulfate, alone, the reaction temperature should preferably be kept in the range of 60~90° C. When using it with a reducing agent such as sodium bisulfite or sodium formaldehyde sulfoxylate, the preferred reaction temperature ranges from 30° C. to 70° C. Examples of an oily initiator include tertiarybutyl hydroperoxide, dibutyl peroxide, benzoil hydroperoxide, perbenzoic acid, hydrogen peroxide, peracetic acid, etc., which may be used alone or with a reducing agent as mentioned above.

Any emulsifier used in the general emulsion polymerization can be used in the present invention. For example, an anionic emulsifier may be used either alone or together with a nonionic emulsifier. The pH should preferably be kept below 4 during the polymerization reaction so as not to ionize the acid monomers.

The neutralizer suitable for use in the present invention can be selected from ammonia or a low volatile alkyl tertiary amine base or from a metal base such as sodium hydroxide, potassium hydroxide, or lithium hydroxide. The amount of the neutralizer being added should be such that the pH of the emulsion polymerization liquid medium can be kept in the range of 6~11.

The neutralizer may be added when the acid monomer concentration in the monomers fed to the reactor is not more than 10%, preferably not more than 2%. Further, it may be added over the first 20% of the monomer feed, based on the total weight of the monomer feed, preferably over the first 40% of the feed. The neutralization process may be effectuated even after the polymerization process is completed. However, the implementation of it in the course of polymerization process is preferred in view of maximization of swellability.

The feeding rate of the entire monomers should be so determined that the instant conversion rate may be kept over 80%, preferably over 90%. The term, "instant conversion rate" refers to the rate with which monomers fed to the reactor are converted into polymers, and it is defined as "the polymers from which the monomers have been converted in the reactor/the monomers fed×100". This rate depends on the reaction rate. To elaborate, the conditions for increasing the instant conversion rate depend on such conditions as being capable of accelerating the reaction rate, namely, the amount of initiators, the amount of emulsifiers, stirring speed, and the compositional ratio of the monomers.

Feeding of the monomer A may or may not be completed at the same point of time as the completion of feeding of the monomer B. If the same, an ideal process of continual change in composition is embodied. If the feeding of the monomer B is completed earlier, what it means is that a homogeneous sheath layer can be additionally introduced by the single-stage polymerization process, assuming that the instant conversion rate is 100% and the particles grow only on the existing polymer particles In the emulsion polymer produced according to the process of the present invention, the weight ratio of the hydrophilic monomers to the hydrophobic monomers is in the range of 1~100:1, and of the total monomer composition, the acid monomer is 0.1~10% by weight, the hydrophilic monomer is 0~20% by weight, and the ethylenically unsaturated monomer is 70~99.9% by weight, based on the total weight of the monomers, with the particle diameters ranging from 0.03 to 4.5 microns.

And, the produced emulsion polymers have microvoids of closed forms, of which the diameters range from 0.1 to 4 micron when dried.

In the preparation process of an emulsion polymer according to the present invention, which is characterized by the use of a single-stage emulsion polymerization method with addition of continuously changing compositions, unlike the conventional polymerization process for preparing a core-shell polymer, the composition of produced polymers changes in a continual and gradual manner instead of a discrete or drastic manner of change. In addition, the concentration of acid monomers in the center of the particle can be increased limitlessly, thereby imparting the maximized alkali-swellable effect wherein the particles produced are swollen by alkali even larger. Furthermore, in the present invention, since the strength of the polymer wall is enhanced and since the swelling progresses in a concentric circular manner during the swelling stage, a vesicle of a closed elliptical morphology can be formed even in the same composition, and the carboxylic acid which serves as a pathway for the base is present inside the particle in the state of having a concentration gradient therein, whereby even a mineral base as well as a volatile base can possibly be utilized.

Another advantageous effect of the present invention is the feasibility of the minimized thickness of the polymer wall, in view of the efficiency of encapsulation, in addition to resistibility to deformation by drying. Unlike the core-shell polymerization process, an interface between the heterogeneous polymer layers is not to be generated in the course of the polymerization process of the present invention so that at a relatively lower rate of A/B, the polymer materials abundant in monomer B can be fully encapsulated, thereby realizing superior swellability of a particle under the same polymerization condition.

According to the present invention, an improved toughness of the particle wall layer is additionally obtained by a continual change in polymer composition. For example, the hydrophobic polystyrene constituting the shell in the core-shell polymer by the conventional multi-stage emulsion polymerization process was weak in mechanical strength. However, if the acryl-based content in the core of the particle is gradually changed to the styrene-based content at the outer shell of the particle, as is the case of the present invention, the toughness index of the polymer layer of homogeneous polystyrene can be improved, thereby achieving the economic benefit based on the reduction of thickness of the polymer wall.

Moreover, there is a further economic benefit resulting from reduction in time required for the completion of the polymerization process, which is possible due to the fact that the same effect as accomplished by the multi-stage core-shell emulsion polymerization process can be obtained in the shorter period of time by the single-stage emulsion polymerization process.

The present invention is described below in more detail using the examples of embodiments, but the present invention should not be construed as limited thereby.

EXAMPLE 1

To a 5-liter 4-neck round-bottomed flask equipped with a thermometer, nitrogen inlet tube, dropping funnel and paddle stirrer was added 1808 g of deionized water followed by 17.55 g of a styrene seed polymer having 5% by weight, of solid content and 70 nm of a particle diameter, and then heated to 80° C., under a nitrogen atmosphere. The flask with the seed polymer and deionized water therein was directly connected to tank B equipped with a stirrer, tank B being also connected in a row to tank A equipped with a stirrer.

A monomer emulsion was prepared by gradually adding to tank B 52.3 g of the monomer mixture consisting of 5% by weight of butyl acrylate, 25% by weight of methylmethacrylate, and 70% by weight of methacrylic acid, following the addition of 0.3 g of sodium dodecyl benzene sulfonate as an emulsifier and 1.1 g of sodium persulfate as a dissociation initiator, both of which dissolved in 19.1 g of deionized water.

Another monomer emulsion was prepared by gradually adding to tank A 1043.7 g of the monomer mixture consisting of 15% by weight of butyl acrylate and 85% by weight of methylmethacrylate, following the addition of 1.5 g of sodium dodecyl benzene sulfonate and 5.5 g of sodium persulfate, both of which dissolved in 610.5 g of deionized water.

After the completion of the preparation of raw materials in feed tanks A and B, when the reaction temperature reached 80° C., the monomer emulsion in tank B was fed to the reaction flask with the rate of 1.5 g/min while at the same time adding the monomer emulsion in tank A to tank B with the rate of 1.5 g/min. After one hour from the initiation of feeding, the rates of feeding the monomer emulsions in tanks A and B were increased to 13.3 g/min and 13.9 g/min, respectively. 10 minutes after the increase of the rate of feeding, 30.1 g of aqueous ammonia (25%) diluted in 381 g of deionized water was added to the reaction flask.

After completion of the monomer emulsions feeding, the dispersion was aged over an hour period and cooled. That is, the maturation was maintained for one hour and then the reaction temperature was lowered to 54~56° C. Then, 0.9 g of t-butyl hydroperoxide dissolved in 1.8 g of deionized water, 0.44 g of sodium formaldehyde sulfoxylate dissolve in 27 g of deionized water, and 9 g of ferrous sulfate 0.15% aqueous solution were added consecutively in the above order. After 20 minutes, 0.9 g of t-butyl hydroxide dissolved in 1.8 g of deionized water was added, and 2 minutes later, followed by the addition of 0.44 g of sodium formaldehyde sulfoxylate dissolved in 27 g of deionized water. The dispersion was then held for 20 minutes, cooled, and filtered with 200 mesh filter.

The emulsion polymer so produced had 27.6% by weight solids content, and 98 cps of viscosity. Upon examination with a transmission electron microscope, the average particle diameter of the dried final emulsion polymer was found to be 850 nm, with the average diameter of the vesicles being 670 nm.

EXAMPLE 2

To a 5-liter 4-neck round-bottomed flask equipped with a thermometer, nitrogen inlet tube, dropping funnel and paddle stirrer was added 918 g of deionized water followed by 17.55 g of a seed polymer and then heated to 80° C., under a nitrogen atmosphere. The flask with the seed polymer and deionized water therein was directly connected to tank B equipped with a stirrer, tank B being also connected in a row to tank A equipped with a stirrer.

A monomer emulsion was prepared by gradually adding to tank B 52.3 g of the monomer mixture, following the addition of 0.3 g of sodium dodecyl benzene sulfonate and 1.1 g of sodium persulfate, both of which dissolved in 19.1 g of deionized water. The monomer mixture consisted of 10% by weight of butyl acrylate, 70% by weight of styrene, and 20% by weight of methacrylic acid Another monomer emulsion was prepared by gradually adding to tank A 523g of the styrene monomer, following the addition of 1.0 g of sodium dodecyl benzene sulfonate and 3.0 g of sodium persulfate, both of which dissolved in 461 g of deionized water.

After the completion of the preparation of raw materials in feed tanks A and B, when the reaction temperature reached 80° C., the monomer emulsion in tank B was fed to the reaction flask with the rate of 16.9 g/min while at the same time feeding the monomer emulsion in tank A to tank B with the rate of 18.1 g/min. After 30 minutes from the initiation of feeding, 30.1 g of aqueous ammonia (25%) diluted in 381 g of deionized water was added to the reaction flask. After completion of the monomer emulsions feeding, the dispersion was aged over an hour period and cooled. That is, the maturation was maintained for one hour and then the reaction temperature was lowered to 54~56° C. Then, 0.9 g of t-butyl hydroperoxide dissolved in 1.8 g of deionized water, 0.44 g of sodium formaldehyde sulfoxylate dissolve in 27 g of deionized water, and 9 g of ferrous sulfate 0.15% aqueous solution were added consecutively in the above order. After 20 minutes elapsed thereafter, 0.9 g of t-butyl hydroxide dissolved in 1.8 g of deionized water was added, and another 2 minutes later, followed by the addition of 0.44 g of sodium formaldehyde sulfoxylate dissolved in 27 g of deionized water. The dispersion was then held for 20 minutes, cooled, and filtered with 200 mesh filter.

The emulsion polymer so produced had 23.9% by weight solids content, and 67 cps of viscosity. Upon examination with a transmission electron microscope, the average particle diameter of the final emulsion polymer was found to be 700 nm, with the average diameter of the vesicles being 530 nm.

EXAMPLE 3

To a 5-liter 4-neck round-bottomed flask equipped with a thermometer, nitrogen inlet tube, dropping funnel and paddle stirrer was added 1808 g of deionized water followed by 87.7 g of a seed polymer, and then heated to 80° C., under a nitrogen atmosphere. The flask with the seed polymer and deionized water was directly connected to tank B equipped with a stirrer, tank B being also connected in a row to tank A equipped with a stirrer.

A monomer emulsion was prepared by gradually adding to tank B 52.3 g of the monomer mixture consisting of 5% by weight of butyl acrylate, 25% by weight of methylmethacrylate, 70% by weight of methacrylic acid, following the addition of 0.3g of sodium dodecyl benzene sulfonate and 1.1 g of sodium persulfate, both of which dissolved in 19.1 g of deionized water.

Another monomer emulsion was prepared by gradually adding to tank A 1043.7 g of the monomer mixture consisting of 15% by weight of butyl acrylate and 85% by weight of methylmethacrylate, following the addition of 1.5 g of sodium dodecyl benzene sulfonate and 5.5 g of sodium persulfate, both of which dissolved in 610.5 g of deionized water.

After the completion of the preparation of raw materials in feed tanks A and B, when the reaction temperature reached 80° C., the monomer emulsion in tank B was fed to the reaction flask with the rate of 3 g/min while at the same time feeding the monomer emulsion in tank A to tank B with the rate of 2.5 g/min. After over one hour elapsed from the initiation of feeding, when there was no remnant of the monomer emulsion remaining in tank B, the feed from tank B to the flask was stopped, and one half of the monomer emulsion remaining in tank A was transferred to tank B. Then, 20 g of divinylbenzene was added to tank A. The feeding from tanks A and B to the reaction flask was recommenced with the rates of 6.7 g/min and 13.3 g/min, respectively. 30.1 g of aqueous ammonia (25%) diluted in 381 g of deionized water was added to the reaction flask over the first 50% of the feed from tank A. After completion of the monomer emulsions feeding, the dispersion was aged over an hour period and cooled. That is, the maturation was maintained for one hour and then the reaction temperature was lowered to 54~56° C. Then, 0.9 g of t-butyl hydroperoxide dissolved in 1.8 g of deionized water, 0.44 g of sodium formaldehyde sulfoxylate dissolve in 27 g of deionized water, and 9 g of ferrous sulfate 0.15% aqueous solution were added consecutively in the above order. After 20 minutes, 0.9 g of t-butyl hydroperoxide dissolved in 1.8 g of deionized water was added, and another 2 minutes later, followed by the addition of 0.44 g of sodium formaldehyde sulfoxylate dissolved in 27 g of deionized water. The dispersion was then held for 20 minutes, cooled, and filtered with 200 mesh filter.

The emulsion polymer so produced had 27.6% by weight solids content, and 104 cps of viscosity. Upon examination with a transmission electron microscope, the average particle diameter of the final emulsion polymer was found to be 550 nm, with the average diameter of the vesicles being 400 nm.

EXAMPLE 4

The process in Example 1 was repeated except the composition of the monomer emulsion in tank A was changed to 13.5% by weight of butyl acrylate, 76.5% by weight of methylmethacrylate, 10.0% by weight of ethyleneglycoldimethacrylate. In this way, the produced emulsion polymer had a 27.4% by weight solids content, and 54 cps of viscosity.

The respective emulsion polymers produced in Example 1 and the present example were separately thinly laid on a glass plate, and were left in an oven of 200° C. for drying. As a result, the emulsion polymer of Example 1 existed in the state of a transparent partial film, whereas the one of the present example existed in the state of white partial sparse film. This proves the fact that the resistibility to a high temperature and to a heat was improved by the introduction of a cross-linking agent.

EXAMPLE 5

The process in Example 1 was repeated except the feed rates from tank A to tank B and from tank B to the flask were respectively changed to as described below.

After the completion of the preparation of raw materials in feed tanks A and B, when the temperature reached 80° C., the monomer emulsion in tank B was fed to the reaction flask with the rate of 2.5 g/min while simultaneously feeding the monomer emulsion in tank A to tank B with the rate of 1.5 g/min. After a certain period of time from the initiation of feeding, when the monomer emulsion in tank B is entirely consumed, tank A was fully opened to fill tank B. Then, the reaction recommenced with the increased rate of feeding from tank B of 13.0 g/min. After 10 minutes from the feed rate increase, 30.1 g of aqueous ammonia (25%) diluted in 381 g of deionized water was added, then followed by the process in Example 1.

The emulsion polymer so produced had 27.5% by weight solids content, and 75 cps of viscosity. Upon examination with a transmission electron microscope, the average particle diameter of the final emulsion polymer was found to be 840 nm, with the average diameter of the vesicles being 650 nm.

The emulsion polymer produced in this example and the one of Example 1 were respectively separately mixed into 38 g of the resin manufactured by Korea Chemical Corp. OREMUL H5250 BINDER (acryl emulsion binder). Then, their viscosities were made identical to each other as being 5 KU, by using a viscosity enhancing agent of the cellulose system. The 8mil-sized paint films were then respectively formulated on a hiding paper. As a result of drying them with the temperature of 25° C. and the relative humidity of 55% for the purpose of determining the rates with which they were dried, it was observed that the paint film containing the product of Example 1 showed a more rapid increase in hiding power of the film than that containing the product of the present example.

EXAMPLE 6

To a 5-liter 4-neck round-bottomed flask equipped with a thermometer, nitrogen inlet tube, dropping funnel and paddle stirrer was added 1808 g of deionized water followed by 87.7 g of a seed polymer and then heated to 80° C., under a nitrogen atmosphere. The flask with the seed polymer and deionized water was directly connected to tank B equipped with a stirrer, tank B being also connected in a row to tank A equipped with a stirrer.

A monomer emulsion was prepared by gradually adding to tank B 52.3 g of the monomer mixture, following the addition of 0.3 g of sodium dodecyl benzene sulfonate and 1.1 g of sodium persulfate, both of which dissolved in 19.1 g of deionized water. The monomer mixture consisted of 90% by weight of isobutyl methacrylate, and 10% by weight of normal-dodecylmercaptan.

Another monomer emulsion was prepared by gradually adding to tank A 1043.7 g of the styrene monomers, following the addition of 1.5 g of sodium dodecyl benzene sulfonate and 5.5 g of sodium persulfate, both of which dissolved in 610.5 g of deionized water.

After the completion of the preparation of raw materials in feed tanks A and B, when the reaction temperature reached 80° C., the monomer emulsion in tank B was added to the reaction flask with the rate of 3.0 g/min while simultaneously feeding the monomer emulsion in tank A to tank B with the rate of 3.0 g/min. After 30 minutes from the initiation of feeding, the rate of feeding from tanks A and B was increased to 13.3 g/min and 13.9 g/min, respectively. 5 minutes after the increase of the feeding rate, 105 g of benzoic acid was added to the flask, and keeping proceeding with the reaction. 30 minutes after the completion of the monomer emulsions feeding, 70.5 g of aqueous ammonia (25%) diluted in 381 g of deionized water was added and followed by aging over an hour period and then cooling.

That is, when the one hour-maturation was terminated, the reaction temperature was lowered to 54~56° C. Then, 0.9 g of t-butyl hydroperoxide dissolved in 1.8 g of deionized water was added to the reaction flask, followed by the addition of 0.44 of sodium formaldehyde sulfoxylate dissolved in 27 g of deionized water and consecutively by the addition of 9 g of ferrous sulfate 0.15% aqueous solution. 20 minutes later, 0.9 g of t-butyl hydroperoxide dissolved in 1.8 g of deionized water was added, and another 2 minutes later, 0.44 g of sodium formaldehyde sulfoxylate dissolved in 27 g of deionized water was added. The dispersion was then held for 20 minutes, cooled and filtered with 200 mesh filter. The emulsion polymer so produced had 23.9% by weight solids content, and 98 cps of viscosity. Upon examination with a transmission electron microscope, the average particle diameter was found to be 520 nm and the average vesicle diameter was found to be 315 nm.

EXAMPLE 7

To a 5-liter 4-neck round-bottomed flask equipped with a thermometer, nitrogen inlet tube, dropping funnel and paddle stirrer was added 1808 g of deionized water followed by 87.7 g of a seed polymer, and then heated to 80° C., under a nitrogen atmosphere. The flask with the seed polymer and deionized water was directly connected to tank B equipped with a stirrer, tank B being also connected to tank A and tank A-1 both of which are equipped with a stirrer.

A monomer emulsion was prepared by gradually adding to tank B 52.3 g of the monomer mixture consisting of 59.5% by weight of ethylacrylate, 40% by weight of methylacrylate, 0.5% by weight of arylmethacrylate, following the addition of 0.3 g of sodium dodecyl benzene sulfonate and 1.1 g of sodium persulfate, both of which dissolved in 19.1 g of deionized water.

Another monomer emulsion was prepared by gradually adding to tank A 1043.7 g of the styrene monomer, following the addition of 1.5 g of sodium dodecyl benzene sulfonate and 5.5 g of sodium persulfate, both of which dissolved in 610.5 g of deionized water. A mixture for tank A-1 was prepared by mixing 21.0 g of methacrylic acid with 40 g of deionized water. After the completion of the preparation of raw materials in feed tanks A, B, and A-1, when the reaction temperature reached 80° C., the monomer emulsion in tank B was fed to the reaction flask with the rate of 3.0 g/min while at the same time feeding the monomer emulsion in tank A to tank B with the rate of 3.0 g/min. 30 minute after the initiation of feeding, the rates of feeding of the monomer emulsions from tanks A and B were increased to 13.3 g/min and 13.9 g/min, respectively. After 5 minutes elapsed from the increase of the feed rates, the material in tank A-1 was fed at once to tank B, and the reaction was kept proceeding. 30 minutes after the completion of the monomer emulsions feeding, 40.5 g of sodium hydroxide dissolved in 381 g of deionized water was added to the reaction flask. The dispersion was held for 3 hours at the temperature of 130° C., and then cooled. Upon lowering the temperature to 54~56° C., 0.9 g of t-butyl hydroperoxide dissolved in 1.8 g of deionized water was added to the reaction flask, 0.44 g of sodium formaldehyde sulfoxylate dissolved in 27 g of deionized water was also added to the flask, and finally 9 g of ferrous sulfate 0.15% aqueous solution was added. 20 minutes later, 0.9 g of t-butyl hydroxide dissolved in 1.8 g of deionized water was added, and another 2 minutes later, followed by the addition of 0.44 g of sodium formaldehyde sulfoxylate dissolved in 27 g of deionized water. The dispersion was then held for 20 minutes, cooled, and filtered with 200 mesh filter. The emulsion polymer so produced had 28.5% by weight solids content and 98 cps of viscosity. Upon examination with a transmission electron microscope, the average particle diameter was found to be 510 nm, and the average vesicle diameter was found to be 285 nm.

What is claimed is:

1. A process for preparing an emulsion polymer comprising:
    placing a first mixture of monomers in a feed tank B which is connected directly to a reactor;
    placing a second mixture of monomers in a feed tank A which is connected to the feed tank B; and
    continuously varying the composition ratio of the monomers of feed tanks A and B in the emulsion polymer by varying the rate of feeding of the second mixture of monomers present in tank A into tank B while simultaneously varying the rate of feeding of the first mixture of monomers present in tank B into the reactor, wherein the first and second mixtures of monomers are simultaneously fluxed in therein while stirring.

2. The process according to claim 1, wherein the first mixtures of monomers in the feed tank B comprises:
    0~80% by weight of ethylenically unsaturated monomers comprising styrene, vinyltoluene, methylstyrene, ethylene butadiene, vinylacetate, vinylchloride, vinylidenchloride, acrylonitrile, alkylacrylate, or alkylmethacrylate;
    10~90% by weight of hydrophilic acid monomers comprising acrylic acid, methacrylic acid, crotonic acid, itaconic acid, fumaric acid, maleic acid, monoalkyl maleate, monoalkyl fumarate, monoalkyl itaconate, or vinyl benzoic acid;
    0~5% by weight of hydrophilic monomers comprising hydroxyalkyl acrylate, hydroxyalkyl methacrylate, or acrylamide; and
    0~5% by weight of cross-linkable poly-functional monomers, and the second mixture of monomers in the feed tank A comprises 90~100% by weight of ethylenically unsaturated monomers comprising styrene, vinyltoluene, methylstyrene, ethylene butadiene, vinylacetate, vinylchloride, vinylidenchloride, acrylonitrile, alkylacrylate alkylmethacrylate, and 0~10% by weight of hydrophilic monomers comprising hydroxyalkyl acrylate, hydroxylkyl methacrylate, or acrylamide.

3. The process according to claim 2, wherein the cross-linkable poly-functional monomers are present in feed tank B and comprise aryl acrylate, aryl methacrylate, ethyleneglycol dimethacrylate, ethyleneglycol diacrylate, 1,6-hexanediol diacrylate, 1,6-hexanediol dimethacrylate, diaryl phthalate, tripropyleneglycol dimethacrylate, or trimethylolpropane trimethacrylate.

4. The process according to claim 1, wherein a seed is used for polymerization at an initial stage of the process.

5. The process according to claim 1, further comprising swelling by hydration during or after the preparing of an emulsion polymer by using a low-volatile alkyl tertiary amine base or a metal base as a neutralizer.

6. The process according to claim 1, wherein at least one feed tank comprising at least one monomer mixture is additionally connected to feed tank A wherein the at least one monomer mixture from the additionally connected at least one feed tank is simultaneously fluxed into tank A.

7. An emulsion polymer prepared by the process in claim 1, in which agradient in the monomer concentration is formed from the inside to the outside of the polymer particle, the weight ratio of the second mixture of monomers in feed tank A to the first mixture of monomers in feed tank B is in the range of 1~100:1, and the composition of the total monomers comprises 0.1~10% by weight of hydrophilic acid monomers, and 0~20% by weight of hydrophilic monomers that are not acidic.

8. The emulsion polymer according to claim 7, in which the diameter of particles of the emulsion polymer is in the range of about 0.03~4.5 microns.

9. The process according to claim 1, wherein the first mixture of monomers is relatively hydrophilic and the second mixture of monomers is relatively hydrophobic.

10. A process for preparing an emulsion polymer comprising:
   placing a first mixture of monomers in a feed tank B, wherein feed tank B is directly connected to a reactor;
   placing a second mixture of monomers in a feed tank A, wherein feed tank A is connected to feed tank B; and
   varying the ratio of the monomers of feed tanks A and B fed into said reactor by gradually increasing the rate at which said second mixture of monomers from tank A are fed into tank B and gradually decreasing the rate at which said first mixture of monomers from tank B are fed into said reactor, wherein said first and second mixtures of monomers fed into said reactor are simultaneously fluxed therein while stirring.

11. The process according to claim 10, wherein the first mixture of monomers in feed tank B comprises:
   0~80% by weight of ethylenically unsaturated monomers comprising styrene, vinyltoluene, methylstyrene, ethylene butadiene, vinylacetate, vinylchloride, vinylidenchloride, acrylonitrile, alkylacrylate, or alkylmethacrylate;
   10~90% by weight of hydrophilic acid monomers comprising acrylic acid, methacrylic acid, itaconic acid, fumaric acid, maleic acid, monoalkyl maleate, monoalkyl fumarate, monoalkyl itaconate, or vinyl benzoic acid;
   0~5% by weight of hydrophilic monomers comprising hydroxyalkyl acrylate, hydroxyalkyl methacrylate, or acrylamide; and
   0~5% by weight of cross-linkable poly-functional monomers, and wherein the second mixture of monomers in feed tank A comprises,
      90~100% by weight of ethylenically unsaturated monomers comprising styrene, vinyltoluene, methylstyrene, ethylene butadiene, vinylacetate, vinylchloride, vinylidenchloride, acrylonitrile, alkylacrylate, or alkylmethacrylate; and
      0~10% by weight of hydrophilic monomers comprising hydroxyalkyl acrylate hydroxyalkyl methacrylate, or acrylamide.

12. The process according to claim 11, wherein the cross-linkable poly-functional monomers are present in feed tank B and comprise aryl acrylate, aryl methacrylate, ethyleneglycol dimethacrylate, ethyleneglycol diacrylate, 1,6-hexanediol diacrylate, 1,6-hexanediol dimethacrylate, diaryl phthalate, tripropyleneglycol dimethacrylate, or trimethylolpropane trimethacrylate.

13. The process according to claim 1, wherein the process is a single-stage polymerization.

14. A process for preparing an emulsion polymer by single-stage polymerization, comprising:
   placing a hydrophilic monomer mixture in a feed tank B which is more hydrophilic than a mixture of tank A, wherein feed tank B is connected directly to a reactor;
   placing a hydrophobic monomer mixture in a feed tank A which is more hydrophobic than the mixture of tank B, wherein feed tank A is connected to feed tank B; and
   continuously varying the ratio of the monomers in said reactor by gradually adding the contents of the feed tank A to the feed tank B and then to the reactor, wherein the mixture of monomers from feed tanks A and B are simultaneously fluxed in said reactor while stirring in order to produce particles of said emulsion polymer, wherein said emulsion polymer has a concentrationgradient of said hydrophilic and hydrophobic monomers from the core to the surface thereof, and wherein swelling by hydration is performed by using ammonia, a low-volatile alkyl tertiary amine base or a metal base as a neutralizer during the polymerization.

15. The process of claim 14, wherein the mixture in the feed tank B comprises:
   0~80% by weight of one or more types of ethylenically unsaturated monomers comprising styrene, vinyltoluene, methylstyrene, ethylene butadiene, vinylacetate, vinylchloride, vinylidenchloride, acrylonitrile, alkylacrylate, or alkylmethacrylate;
   10~90% by weight of one or more types of hydrophilic acid monomers comprising acrylic acid, methacrylic acid, crotonic acid, itaconic acid, fumaric acid, maleic acid, monoalkyl maleate, monoalkyl fumarate, monoalkyl itaconate, or vinyl benzoic acid;
   0~5% by weight of one or more types of hydrophilic monomers comprising hydroxyalkyl acrylate, hydroxyalkyl methacrylate, or acrylamide; and
   0~5% by weight of one or more types of cross-linkable poly-functional monomers, and the mixture in the feed tank A comprises,
      90~100% by weight of one or more types of ethylenically unsaturated monomers comprising styrene, vinyltoluene, methylstyrene, ethylene butadiene, vinylacetate, vinylchloride, vinylidenchloride, acrylonitrile, alkylacrylate, or alkylmethacrylate; and
      0~10% by weight of one or more types of hydrophilic monomers comprising hydroxyalkyl acrylate, hydroxyalkyl methacrylate, or acrylamide.

16. A process for preparing an emulsion polymer according to claim 15, wherein the cross-linkable poly-functional monomers are selected from the group consisting of aryl acrylate, aryl methacrylate, ethyleneglycol dimethacrylate, ethyleneglycol diacrylate, 1,6-hexanediol diacrylate, 1,6-hexanediol dimethacrylate, diaryl phthalate, tripropyleneglycol dimethacrylate, and trimethylolpropane trimethacrylate.

17. A process for preparing an emulsion polymer according to claim 14, wherein a seed is used for beginning the polymerization.

18. A process for preparing an emulsion polymer according to claim 14, wherein one or more feed tanks are additionally connected to the feed tank A so that monomer mixture(s) from said additional feed tank(s) are simultaneously fluxed into the tank A.

19. An emulsion polymer prepared by the process in claim 14, wherein said concentration gradient of said hydrophilic and hydrophobic monomers has a weight ratio of the hydrophilic monomer to the hydrophobic monomer in the range of 1~100:1, and the composition of the emulsion polymer comprises 0.1~10% by weight of hydrophilic acid monomers, 0~20% by weight of hydrophilic monomers other than hydrophilic acid monomers, and 70~99.9% by weight of ethylenically unsaturated monomers.

20. An emulsion polymer according to claim 19, in which the diameter of the polymer particle is in the range of about 0.03~4.5 microns.

* * * * *